US012505883B2

(12) United States Patent
Ganesh Rao et al.

(10) Patent No.: US 12,505,883 B2
(45) Date of Patent: Dec. 23, 2025

(54) PRE-READ OPERATION FOR MULTI-PASS PROGRAMMING OF MEMORY DEVICES

(71) Applicant: Micron Technology, Inc., Boise, ID (US)

(72) Inventors: Nagendra Prasad Ganesh Rao, Folsom, CA (US); Sead Zildzic, Jr., Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 399 days.

(21) Appl. No.: 18/110,303

(22) Filed: Feb. 15, 2023

(65) Prior Publication Data

US 2023/0307058 A1 Sep. 28, 2023

Related U.S. Application Data

(60) Provisional application No. 63/322,495, filed on Mar. 22, 2022.

(51) Int. Cl.
*G11C 16/10* (2006.01)
*G11C 16/08* (2006.01)
*G11C 16/34* (2006.01)

(52) U.S. Cl.
CPC ........... *G11C 16/102* (2013.01); *G11C 16/08* (2013.01); *G11C 16/3459* (2013.01)

(58) Field of Classification Search
CPC .... G11C 16/08; G11C 16/102; G11C 16/3459

USPC .................................................. 365/189.011
See application file for complete search history.

(56) References Cited

U.S. PATENT DOCUMENTS

| 2008/0049506 | A1* | 2/2008 | Guterman | G11C 16/3418 |
| | | | | 365/185.12 |
| 2013/0094294 | A1* | 4/2013 | Kwak | H10B 43/35 |
| | | | | 365/185.24 |
| 2018/0074896 | A1* | 3/2018 | Takada | G06F 11/1048 |
| 2022/0293186 | A1* | 9/2022 | Lee | G11C 16/14 |
| 2024/0385781 | A1* | 11/2024 | Wang | G06F 3/0604 |

\* cited by examiner

*Primary Examiner* — Sung Il Cho
(74) *Attorney, Agent, or Firm* — Lowenstein Sandler LLP (57) ABSTRACT

A first program pass of a multi-pass program operation is caused to be performed at a memory array. A first program voltage is applied to a wordline of a block of the memory array to program one or more memory cells during the first program pass. Subsequent to the first program pass of the multi-pass program operation, a pre-read operation is caused to be performed to read data corresponding to the first program pass and from the one or more memory cells. Whether a shift of a threshold voltage corresponding to the one or more memory cells satisfies a condition related to a threshold voltage change is determined based on the pre-read operation. Responsive to determining that the shift of the threshold voltage satisfies the condition, an updated second program voltage of a second program pass of the multi-pass program operation is determined.

20 Claims, 6 Drawing Sheets

PRE-READ OPERATION FOR MULTI-PASS PROGRAMMING OF MEMORY DEVICES

TECHNICAL FIELD

Embodiments of the disclosure relate generally to memory sub-systems, and more specifically, relate to performing a pre-read operation during multi-pass programming of a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to performing a pre-read operation with a multi-pass program operation to program data to a memory device of a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. For example, an open block can refer to a block in which some of the wordlines have associated memory cells which have been programed, but other wordlines have associated memory cells which are not currently programmed (e.g., are in an erase state). A closed block can refer to a block in which all of the wordlines have associated memory cells which have been programmed. A block can also be characterized based on age, which can be defined in view of a number of program/erase (P/E) cycles that have been performed with respect to the block. For example, a cycled block can refer to a block that has undergone a number of P/E cycles that exceeds a first threshold number of P/E cycles (e.g., an older block), and a fresh block can refer to a block that has undergone a number of P/E cycles less than a second threshold number of P/E cycles (e.g., a newer block).

One phenomenon observed in memory devices is threshold voltage (VT) distribution shift, also referred to herein as temporal voltage shift (TVS) or threshold voltage shift. For example, with respect to programmed pages of a block, charge loss, such as storage charge loss (SCL), intrinsic charge loss (ICL), quick charge loss (QCL), or lateral charge loss (LCL), can cause VT distributions of the programmed pages to shift towards lower voltages as charge diminishes over time and/or with respect to temperature. That is, due to charge loss VT distributions (and on an individual memory cell level, the program levels) shift towards lower voltages as a function of the amount of time elapsed after the data was programmed and the temperature of the memory device over the amount of time.

The shift in threshold voltage distribution can be exacerbated in memory devices that use a multi-pass program operation (also referred to as a "multi-pass programming operation" herein) that writes data to one or more memory devices in multiple stages. A multi-pass program operation can refer to a program of data at a memory device where the data is written to the memory device in multiple stages (e.g., at least two stages, such as an initial program pass and a subsequent program pass(es) where the memory cells are fully written after the subsequent/final program pass). In most cases, the program passes of a multi-pass program operation are performed consecutively or at least shortly one after another (e.g., within seconds or several minutes) such that the written memory cells do not experience a material amount of charge loss (e.g., negligible threshold voltage shift) between the program passes. In other cases, a significant delay may be experienced between the performance of the initial program pass and the subsequent program pass—which may contribute to material charge loss, and consequently material threshold voltage shift. For instance, the memory sub-system controller may initiate an initial program pass that writes data to the memory device and may delay the performance of a subsequent program pass in order to perform other higher priority operations, for example. The delay between the initial program pass and the subsequent program pass may be material (e.g., several hours and at operational temperatures), which can contribute to significant threshold shift at the partially written memory cells. If no compensation for the threshold voltage shift is performed, the subsequent program pass may program the memory cells to a program state that does not accurately reflect the bit state (e.g., that produces bit errors).

Aspects of the present disclosure address the above and other challenges by performing a pre-read operation between the initial program pass and the subsequent program pass of a multi-pass program operation. The pre-read operation can read data from the one or more memory cells associated with a wordline and that were partially written by the initial program pass (e.g., the multi-pass program operation has not been completed). For example, the pre-read operation can read data from a particular program level (e.g., where a program level can refer to a voltage level or value at which each bit or distribution of a memory cell, and in particular a multi-bit memory cell, is programmed) of the one or more memory cells associated with the wordline. The data read during the pre-read operation can be indicative of a shift in threshold voltage corresponding to the one or more memory cells associated with the wordline. As such, the data from the pre-read operation can further be used to determine an updated program voltage (e.g., different from a default program voltage that would be used if no threshold voltage shift were present and/or no compensation performed).

For example and in some embodiments, an error count can be determined from the data read from the pre-read operation. A record (e.g., a lookup table or other data structure) that maps particular error counts (or ranges of error counts) to particular program voltages can be used to identify an appropriate program voltage (e.g., updated program voltage) that can compensate for the estimated threshold voltage shift. The particular program voltage corresponding to the determined error count can be selected and used as the updated program voltage for the subsequent program pass. The updated programming voltage can compensate for any threshold voltage shift (e.g., due to charge loss) such that resultant bit errors from a delay between program passes of a multi-pass program operation are reduced or eliminated.

Advantages of the approaches and embodiments described herein include, but are not limited to, improved performance in the memory sub-system. For example, by being able to compensate for charge loss, and in particular charge loss occurring during the programming passes of a multi-pass program operation the number of bit errors of a memory sub-system can be reduced making the memory sub-system (and the memory device) more reliable and accurate.

Figure 1A:
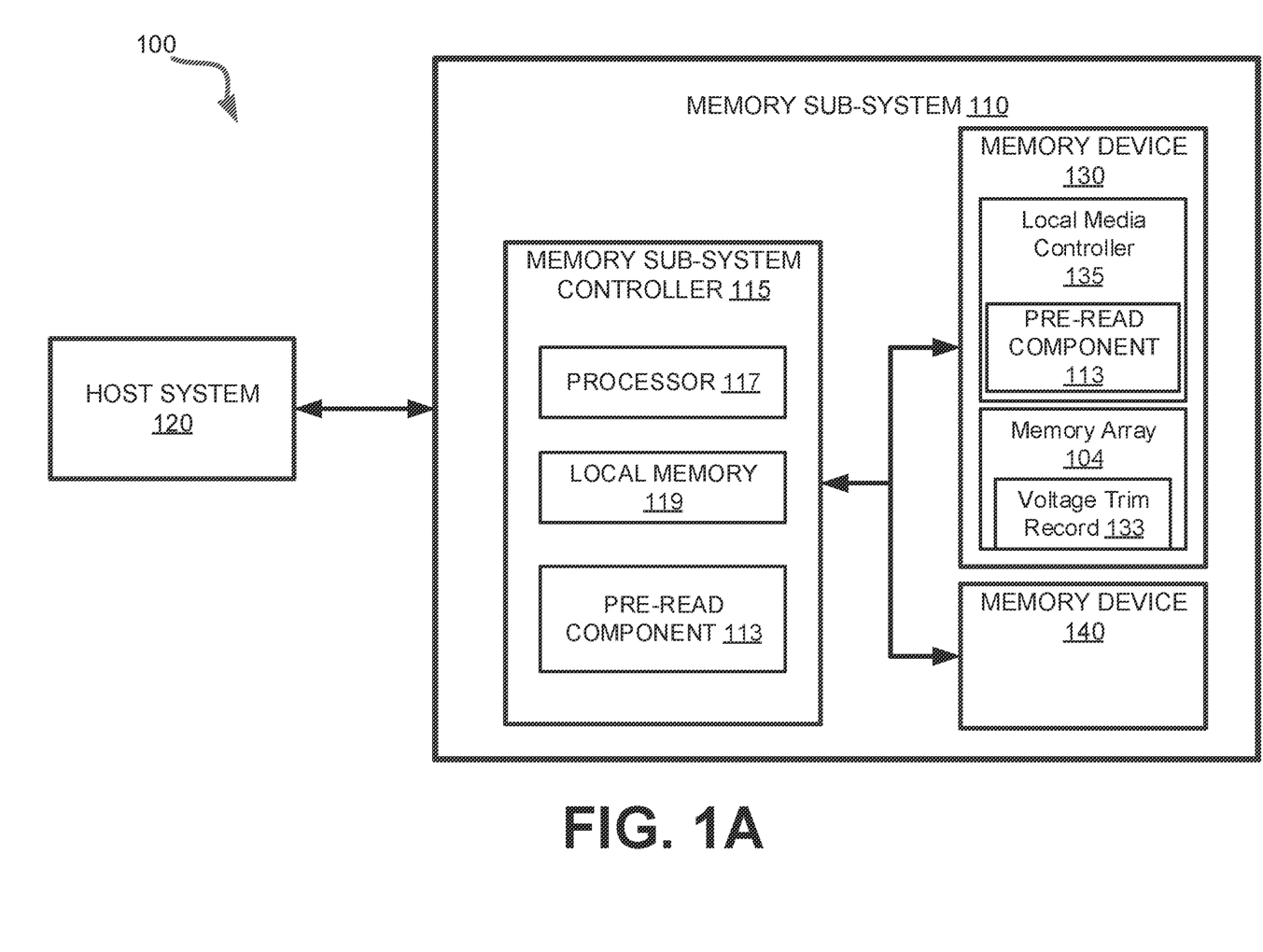
FIG. 1A illustrates an example computing system that includes a memory sub-system, in accordance with some embodiments of the present disclosure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAIVI), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a pre-read component 113 that can perform a pre-read operation as part of multi-pass programming, as further described herein. In some embodiments, the operations of the pre-read component 113 may, in part or in entirety, be performed at memory device 130 (e.g., local media controller 135), memory sub-system controller 115, or a combination thereof. A voltage trim record 133 can be stored at memory array 104 in accordance with some embodiments, and as further described below. It can be noted that pre-read component 113 can be included in local media controller 135 and/or memory sub-system controller 115 of FIG. 1B, in accordance with some embodiments.

In some embodiments, pre-read component 113 can cause an initial program pass of a multi-pass program operation to be performed at memory array 104. A first program voltage is applied to a wordline of a block of the memory array 104 to program one or more memory cells associated with the wordline during the initial program pass. Subsequent to the initial program pass of the multi-pass program operation, pre-read component 113 causes a pre-read operation to be performed that reads data corresponding to the initial program pass and from the one or more memory cells associated with a wordline of the block of the memory array 104. The pre-read component 113 determines, based on the pre-read operation, whether a shift in the threshold voltage (VT) corresponding to the one or more memory cells associated with the wordline satisfies a condition related to a threshold voltage change. Responsive to determining that the shift of the threshold voltage corresponding to the one or more memory cells associated with the wordline satisfies the condition, pre-read component 113 determines an updated second program voltage of a subsequent program pass of the multi-pass program operation.

Figure 1B:
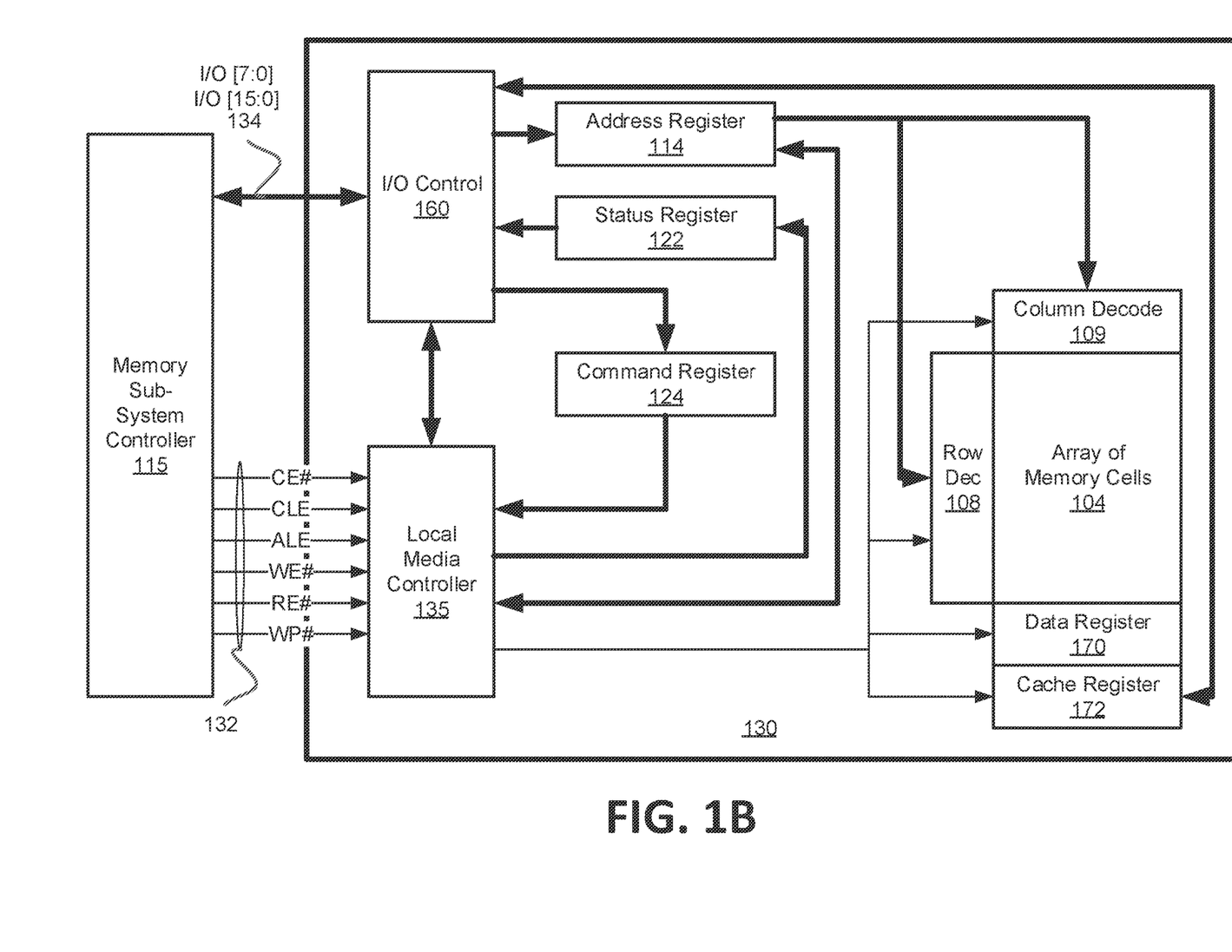
FIG. 1B is a simplified block diagram of a first apparatus, in the form of a memory device, in communication with a second apparatus, in the form of a memory sub-system controller of a memory sub-system (e.g., memory sub-system 110 of FIG. 1A), in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 can optimize program verify pairing in a multi-level cell memory device by utilizing dynamic level pairing and/or always paired programming level verifies.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
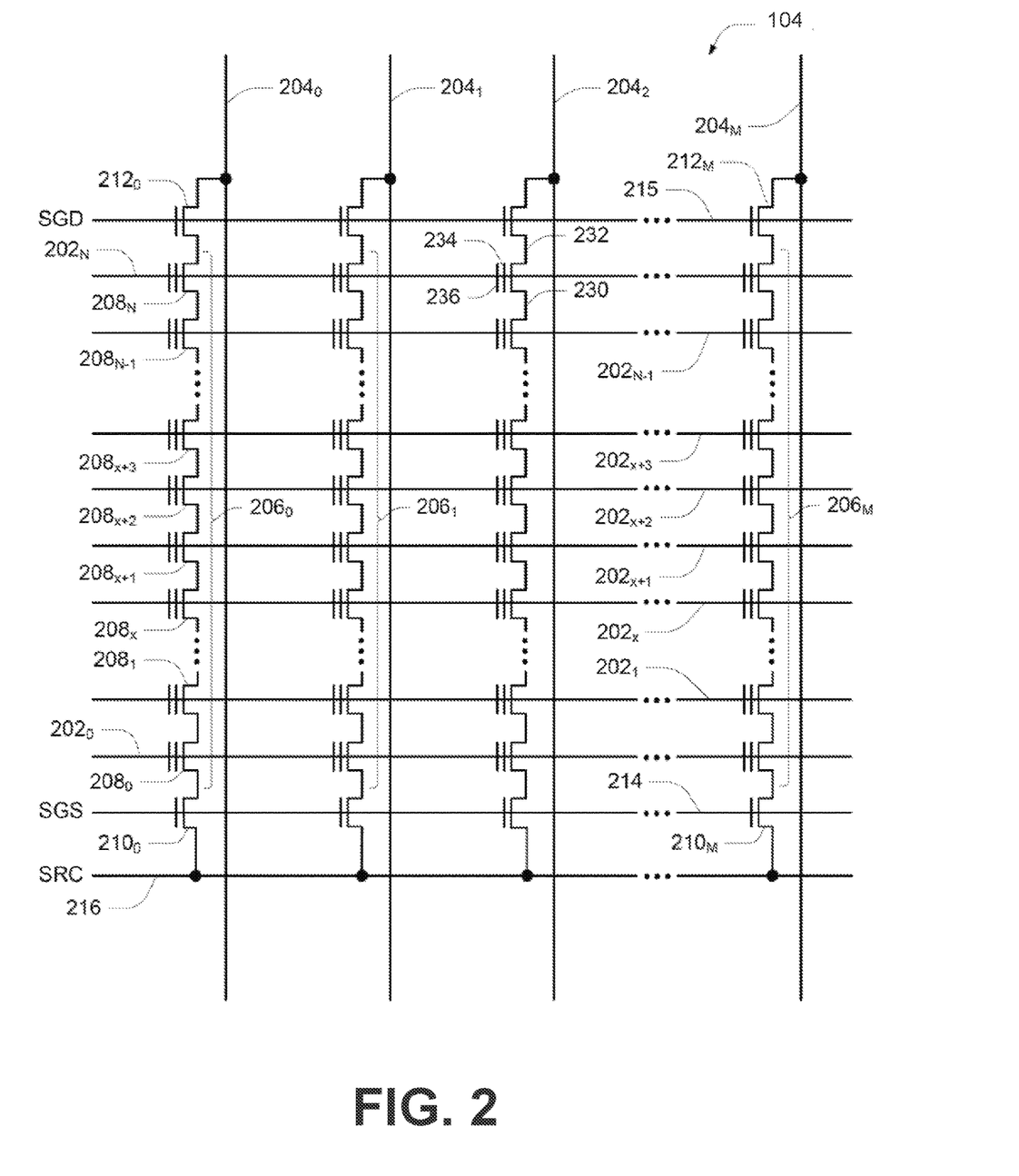
FIG. 2 is a schematic of portions of an array of memory cells, such as a NAND memory array, as could be used in a memory of the type described with reference to FIG. 1B, in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $206_0$ to 206M. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
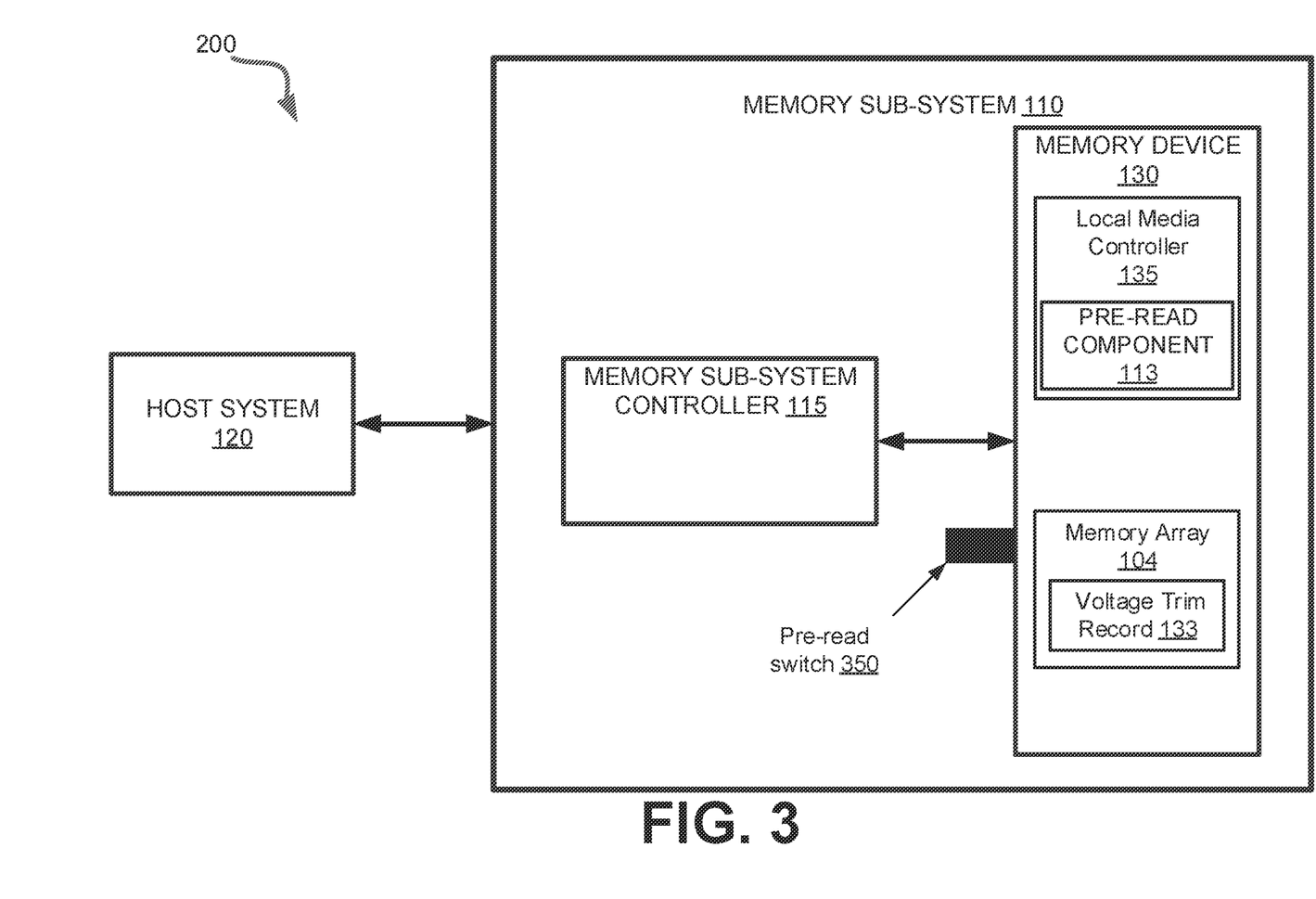
FIG. 3 illustrates an example of a simplified computing system that includes a memory sub-system, in accordance with some embodiments of the present disclosure.

FIG. 3 illustrates an example of a simplified computing system that includes a memory sub-system, in accordance with some embodiments of the present disclosure. Elements of FIG. 1A-1B are used in FIG. 3 to help describe aspects of the disclosure.

In some embodiments, host system 120 may issue one or more commands to memory sub-system 110 to store data, such as user data, at memory sub-system 110. Responsive to the command(s) from host system 120, memory sub-system controller 115 may perform a multi-pass program operation (also referred to as "multi-pass programming operation" herein) to write the data to one or more memory devices 130 of a wordline. As noted above, multi-pass programming operation can refer to a program of data at a memory device 130 where the data is written to the memory device 130 in multiple stages (e.g., at least two stages, such as an initial program pass and subsequent program pass(es)). In many instances, the multi-pass program operation can be performed on multi-bit memory cells, such as QLC memory cells. It can be noted that a multi-pass program operation using two program passes is described herein for the sake of illustration, rather than limitation. Aspects of the disclosure can be applied to memory sub-systems that used any number of program passes in performing a multi-pass program operation.

In some embodiments, to perform a multi-pass program operation, memory sub-system controller 115 can send an initial program pass command to memory device 130. The local media controller 135 (e.g., pre-read component 113) of the memory device 130 can receive the initial program pass command and perform the initial program pass at a location (e.g., wordline) of the memory array 104. In some embodiments, after performing the initial program pass local media controller 135 can send a status response to memory sub-system controller 115 indicating whether the initial program pass has been performed successfully. In some embodiments, to perform the multi-pass program operation, the memory sub-system controller 115 can send a subsequent program pass command to memory device 130. The local media controller 135 (e.g., pre-read component 113) of the memory device 130 can receive the subsequent program pass command and perform the subsequent program pass at the same location of the memory array 104. In some embodiments, after performing the subsequent program pass, the local media controller 135 can send a status response to memory sub-system controller 115 indicating whether the subsequent program pass has been performed successfully.

In an illustrative embodiment, a multi-pass program operation can include two stages, such as a coarse program operation and a fine program operation (e.g., in addition to a pre-read operation). In some embodiments, the coarse program operation (e.g., coarse program pass) can be performed prior to the fine program operation (e.g., fine program pass). The coarse program operation can be used to program the one or more memory cells of a wordline at predefined voltage level with a greater voltage tolerance (e.g. ±300 millivolts), and the fine program operation can be used to program the same one or more memory cells of the wordline to the predefined voltage level but with a lesser voltage tolerance (e.g. ±5 millivolts).

In some embodiments, the multi-pass program operation can program all the voltage levels of the multi-bit memory cells at each program pass. For example, QLC memory cells include 16 program levels (also referred to as "program voltage levels" herein). The coarse program operation can program all 16 program levels of a wordline to a coarse program level and the fine program operation can program all 16 program levels of the wordline to a fine program level. In other embodiments, each program pass does not program all program levels of multi-bit memory cells. Rather, in such embodiments the initial program pass can program some program levels and a subsequent program pass programs other program levels.

As noted above, the performance of an initial program pass (e.g., coarse program operation) can be delayed by some time before a subsequent program pass is performed. Extended time delay between the performance of the initial program pass and a subsequent program pass can exacerbate charge loss (e.g., as a function of time and temperature), which results in a final program of the memory cells to program levels that do not accurately represent the data (i.e., resulting in error bits).

In some embodiments, a pre-read operation can be performed by local media controller 135 (e.g., pre-read component 113) between the initial program operation and a subsequent program operation. For example, a pre-read operation can be performed by local media controller 135 after a coarse program operation and immediately prior to a fine program operation. In some embodiments, the pre-read operation can be part of the multi-pass program operation. In some embodiments, the pre-read operation can read data from one or more memory cells of the memory array 104 (e.g., wordline) that was previously written by an initial program pass (e.g., and not yet fully written by a subsequent program pass of the multi-pass program operation).

In some embodiments, based on the data read by the pre-read operation the local media controller 135 (e.g., pre-read component 113) can determine or estimate the amount voltage shift (e.g., the threshold voltage (VT) shift) the memory cells have experienced since the initial program pass was performed.

In some embodiments, local media controller 135 (e.g., pre-read component 113) can determine whether the shift in threshold voltage corresponding to the one or more memory cells associated with a wordline satisfies a condition related to threshold voltage change (of the one or more memory cells) based on the pre-read operation (e.g., exceeds an amount of threshold voltage change).

In some embodiments, if the shift in threshold voltage does not satisfy the condition (e.g., no to negligible shift in threshold voltage), local media controller 135 (e.g., pre-read component 113) can use a default program voltage to perform the subsequent program pass. In some embodiments, the default program voltage(s) can be stored at voltage trim record 133 of memory array 104. It can be noted that voltage trim record 133 is illustrated as stored in the memory array 104 of the same memory device 130 at which the multi-pass program operation is performed. In other embodiments, the voltage trim record 133 can be stored in another location, such as a different memory device 130, the memory array of a different memory device 130, the memory sub-system controller 115 (e.g., volatile memory of the memory sub-system controller 115), a different memory sub-system 110, or a combination thereof.

In some embodiments, if the shift in threshold voltage satisfies a condition related to threshold voltage change (e.g., at the one or more memory cells of the wordline), pre-read component 113 can determine an updated program voltage (e.g., updated voltage trim where a voltage trim adds or subtracts a specified voltage amount from a predetermined voltage value, such as the default program voltage) for the subsequent program pass. For example, the update program voltage can be selected such that the update program voltage for the subsequent program pass can compensate for the threshold voltage shift and can cause the one or more memory cells of the wordline to be programmed to the correct voltage levels (e.g., indicative of the data to be stored). In another example, the default program voltage and the updated voltage trim can be combined to generate the updated program voltage.

In some embodiments, to determine the updated program voltage, the local media controller 135 (e.g., pre-read component 113) can retrieve the updated program voltage using the voltage trim record 133. The voltage trim record 133 record can store various updated program voltages (e.g., updated voltage trims) corresponding to different threshold voltage changes or different ranges of threshold voltages changes.

In some embodiments, after the pre-read operation is performed by the memory device 130, the memory device 130 (e.g . . . , pre-read component 113) can perform a subsequent program pass to program the one or more memory cells of the wordline (e.g., fully program) using the determine program voltage (e.g., either the default program voltage or the updated program voltage). In some embodiments, the subsequent program pass can be performed by the memory device 130 based on a command received by the memory sub-system controller 115 (e.g., command to perform a subsequent program pass, such as a fine program operation). Responsive to performing the subsequent program pass, the memory device 130 can send a status message to the memory sub-system controller 115 indicating whether the subsequent program pass has been complete successfully. It can be noted that in some embodiments, the memory sub-system controller 115 sends separate commands for the initial program pass and the subsequent program pass and the time between issuing the separate commands can contribute to charge loss, as noted herein.

The pre-read operation can be initiated in several different ways. In some embodiments, the memory sub-system controller 115 does not issue a distinct pre-read operation command to the memory device 130. Rather, the pre-read operation can be performed by memory device 130 responsive to a subsequent program pass command, from memory sub-system controller 115 and to memory device 130, to perform a subsequent program pass. For example, the memory device 130 can receive a subsequent program pass command from memory sub-system controller 115 to perform a subsequent program pass and responsive to the command, local media controller 135 (e.g., pre-read component 113) automatically (e.g., without a distinct pre-read operation command) performs the pre-read operation prior to performing the subsequent program pass. It can be noted that in some embodiments, the performance of the pre-read operation can be transparent to the memory sub-system controller 115.

In some embodiments, the memory device 130 can receive the command to perform the subsequent program pass and responsive to receiving the command check whether a pre-read operation status bit has been set. If the status bit has been set, the memory device 130 (e.g., pre-read component 113) can automatically perform the pre-read operation prior to performing the subsequent program pass. If the status bit has not been set, the memory device 130 can perform the subsequent program pass without performing the pre-read operation. In some embodiments, the pre-read operation status bit can be set by the memory sub-system controller via the pre-read switch 350 (e.g., external pin of the memory device 130) or by a pre-read status bit command issued by memory sub-system controller 115 to memory device 130. The pre-read status bit can be stored at the memory device 130, in some embodiments.

In still other embodiments, the memory sub-system controller 115 can issue a discrete pre-read operation command (e.g., in addition to the initial program pass command and subsequent program pass command) to the memory device 130 directing the memory device 130 to perform the pre-read operation.

The pre-read operation can be performed in a variety of different manners. In some embodiments, the pre-read operation can read a particular program level for data written at that program level, rather than all the program levels for the one or more memory cells. For example, the pre-read operation may not read all the data stored at the one or more memory cells of the wordline (e.g., the local media controller 135 may not read all the data from the one or more memory cells). Rather, the pre-read operation may read data at a particular program level (e.g., voltage distribution). The read data may indicate the threshold voltage shift of the particular voltage distribution. The threshold voltage shift at the particular program level can be representative (e.g., a function of) of the threshold voltage change at other program levels (e.g., distributions) of the memory cells. For instance, QLC memory has 16 voltage distributions based on 16 program levels (e.g., program levels 0-15). Program level 0 is the lowest voltage level and associated with the lowest distribution, and the program level 15 is the highest voltage level and associated with the highest distribution. Program level 15 may experience the most threshold voltage shift due to charge less relative to the remaining program levels 0-14. The pre-read operation can read data from the one or more memory cells of the wordline using the threshold voltage corresponding to program level 15, rather than read data associated with program levels 0-14. Program level 15 may have the best signal for indicating the amount of threshold voltage shift since distribution 15 experiences the most threshold voltage shift of the distributions 0-15.

In other embodiments, all the data from the one or more memory cells associated with the wordline can be read. In some embodiments, the data stored at the one or more memory cells can be determined using an alternative program level (e.g., program level 13) or using multiple program levels. In some embodiments, a single pre-read operation can be performed (e.g., reading the data from the one or more memory cells once). In other embodiments, the pre-read operation can be performed multiple times (e.g., reading data from the one or more memory cells multiple times using the same program level or different program levels).

The pre-read operation, and the data obtained therefrom, can be used to determine or estimate the shift in threshold voltage. In some embodiments, the pre-read operation can determine an error count for a particular distribution (e.g., associated with a particular program level) for the one or more memory cells of the wordline. In some embodiments, the error count can include or represent the number of error bits of the one or more memory cells of the wordline. In some embodiments, the error count can include or represent a ratio of the number of error bits to the total number of bits or memory cells that were read from the pre-read operation.

In some embodiments, to determine whether the shift in threshold voltage corresponding to the one or more memory cells associated with the wordline satisfies the condition related to the threshold voltage change, the memory device 130 (e.g., pre-read component 113) can determine the error count based on the data read from the pre-read operation, and determine whether the error count exceeds a threshold error count. For example, the threshold error count can be set to zero (no errors) or some number of errors that are correctable by the ECC (error correction code) of the memory device 130. If the error count is less than or equal to the threshold error count, memory device 130 (e.g., pre-read component 113) determines that the condition is not satisfies and selects the default program voltage. If the error count exceeds the threshold error count, memory device 130 determines that the condition is satisfied and selects and updated program voltage.

In some embodiments, to determine the program voltage, such as the updated program voltage, for the subsequent program pass of the multi-pass program operation, memory device 130 (e.g., pre-read component 113) can identify the voltage trim record 133 (that can identify updated program voltages and/or default program voltages) and select an updated program voltage identified in the voltage trim record 133. For example, the voltage trim record 133 can include a look up table that maps error counts (or ranges of error counts) to particular (updated) program voltages. For instance, zero errors (estimated from the data read from the pre-read operation) can be mapped to the default program voltage, 1-3 errors can be mapped to a first updated program voltage, 4-7 errors can be mapped to a second updated program voltage, and so forth.

In some embodiments, the update program voltage of the subsequent program pass of the multi-pass program operation can be determined using a model, such as a trained machine learning model trained using input data that is paired with particular output data (e.g., pairs of features sets and labels provided to train a supervised machine learning model). In some embodiments, the model can be a statistical model or other model. In some embodiments, the data read from the one or memory cells or intermediate data (e.g., error count) can be used as input to the model and the output of the model can identify the updated program voltage.

After identifying the program voltage, memory device 130 (e.g., pre-read component 113) can perform a subsequent program pass using the updated program voltage to program the one or more memory cells of the wordline.

In some embodiments, the memory array 104 and the control logic (e.g., local media controller 135) can be packaged or encased in a single integrated circuit package. In some embodiments, the memory device 130 can include a nitride storage type of memory device 130 (e.g., replacements gate) rather than a polysilicon type memory device 130 (e.g., floating gate type).

Figure 4:
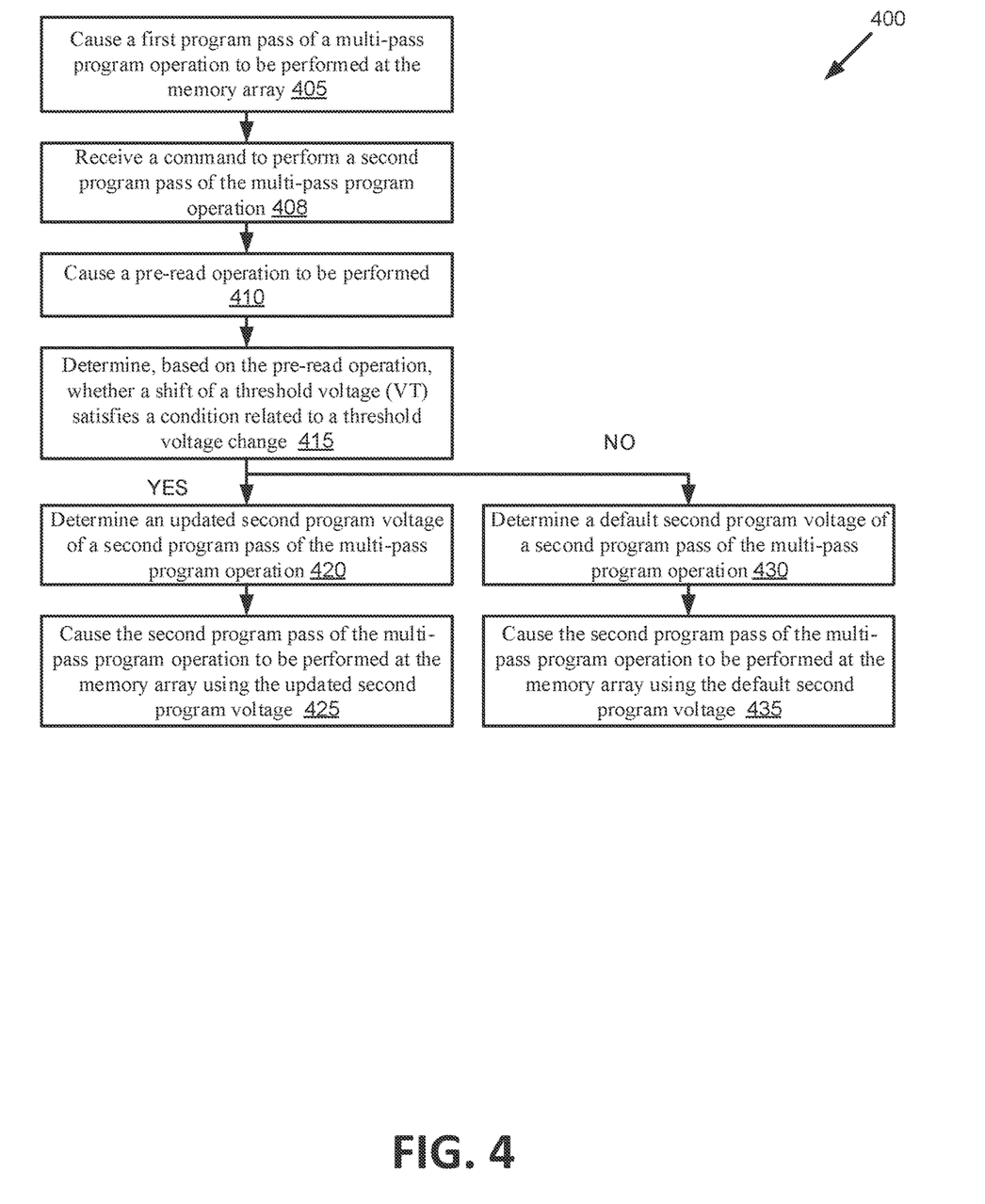
FIG. 4 is a flow diagram of an example method of performing a multi-pass program operation that includes a pre-read operation, in accordance with some embodiments of the present disclosure.

FIG. 4 is a flow diagram of an example method of performing a multi-pass program operation that includes a pre-read operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by pre-read component 113 of FIG. 1A and/or FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405 of method 400, a first program pass is performed. For example, the processing logic (e.g., pre-read component 113) causes a first program pass of a multi-pass program operation to be performed at the memory array of the memory device. In some embodiments, processing logic performs the first program pass of the multi-pass program operation. In some embodiments, during the first program pass, a first program voltage is applied to a wordline of multiple wordlines of a block of the memory array to program one or more memory cells associated with the wordline. In some embodiments, the memory array and the control logic (e.g., local media controller) are encased in a single integrated circuit package.

At operation 408, a command to perform a second program pass is received. For example, processing logic receives a command to perform a second program pass of the multi-pass program operation at the memory array. In some embodiments, the command is received from memory sub-system controller 115 and by memory device 130 (e.g., local media controller 135).

At operation 410, a pre-read operation is performed. For example, the processing logic causes a pre-read operation to be performed. In In some embodiments, subsequent to the first program pass of the multi-pass program operation, processing logic causes a pre-read operation to be performed to read data corresponding to the first program pass and from the one or more memory cells associated with the wordline of the block of the memory array. In some embodiments, the pre-read operation is performed responsive to the command to perform the second program pass.

In some embodiments, causing the pre-read operation to be performed to read the data corresponding to the first program pass and from the one or more memory cells associated with the wordline of the block of the memory array includes reading data corresponding to a particular distribution of multiple distributions that are associated with the one or more memory cells associated with the wordline. In some embodiments, the one or more memory cells include multi-bit memory cells.

At operation 415, whether the shift in VT satisfies a condition is determined. For example, processing logic determines, based on the pre-read operation, whether a shift of a threshold voltage (VT) satisfies a condition related to a threshold voltage change. In some embodiments, the threshold voltage shift corresponds to the one or more memory cells associated with the wordline. If processing logic determines that the VT shift satisfies the condition related to a threshold voltage change, processing logic proceeds to operation 420. If processing logic determines that the VT shift does not satisfy the condition related to a threshold voltage change, processing logic proceeds to operation 430.

In some embodiments, determining whether the shift of the threshold voltage (VT) corresponding to the one or more memory cells associated with the wordline satisfies the condition related to the threshold voltage change based on the pre-read operation, processing logic determines an error count based on the data read from the pre-read operation. In some embodiments, processing logic determines whether the error count exceeds a threshold error count.

At operation 420, an updated second program voltage is determined. For example, processing logic determines an updated second program voltage of a second program pass of the multi-pass program operation. In some embodiments, responsive to determining that the shift of the threshold voltage corresponding to the one or more memory cells associated with the wordline satisfies the condition, processing logic determines an updated second program voltage of a second program pass of the multi-pass program operation.

In some embodiments, determining the updated second program voltage of the second program pass of the multi-pass program operation, processing logic identifies a record identifying multiple updated second program voltages. In some embodiments, processing logic selects the updated second program voltage from the multiple updated second program voltages based on the data read from the pre-read operation.

In some embodiments, to determine the updated second program voltage of the second program pass of the multi-pass program operation, processing logic identifies a record identifying multiple updated second program voltages responsive to determining that the error count exceeds the threshold error count. In some embodiments, each of the multiple updated second program voltages are associated with a particular error count. In some embodiments, processing logic, selects the updated second program voltage from the multiple updated second program voltages based on the error count.

In some embodiments, to determine the updated second program voltage of the second program pass of the multi-pass program operation, processing logic identifies a model associated with the multiple second program voltages. In some embodiments, processing logic identifies the updated second program voltage from output of the model. The input to the model corresponds to the data read from the pre-read operation.

At operation 425, a second program pass is performed. For example, processing logic causes the second program pass of the multi-pass program operation to be performed at the memory array using the updated second program voltage. In some embodiments, processing logic performs the second program pass of the multi-pass program operation using the updated second program voltage. In some embodiments, during the second program pass, processing logic applies the updated second program voltage to the one or more memory cells associated with wordline of the multiple wordlines of the block of the memory array to program the one or more memory cells associated with the wordline.

At operation 430, a default second program voltage is determined. For example, processing logic determines a default second program voltage of a second program pass of the multi-pass program operation.

In some embodiments, to determine the default second program voltage of the second program pass of the multi-pass program operation, processing logic identifies a record identifying the default second program voltages. In some embodiments, processing logic selects the default second program voltage (e.g., from the multiple second program voltages) based on the data read from the pre-read operation.

At operation 435, a second program pass is performed. For example, processing logic causes the second program pass of the multi-pass program operation to be performed at the memory array using the default second program voltage. In some embodiments, the processing logic performs the second program pass of the multi-pass program operation using the default second program voltage. In some embodiments, responsive to determining that the shift of the threshold voltage corresponding to the one or more memory cells associated with the wordline does not satisfy the condition, processing logic causes the second program pass of the multi-pass program operation to be performed at the memory array using a default second program voltage. In some embodiments, processing logic applies the default second program voltage to the wordline of the multiple wordlines of the block of the memory array to program the one or more memory cells associated with wordline during the second program pass.

Figure 5:
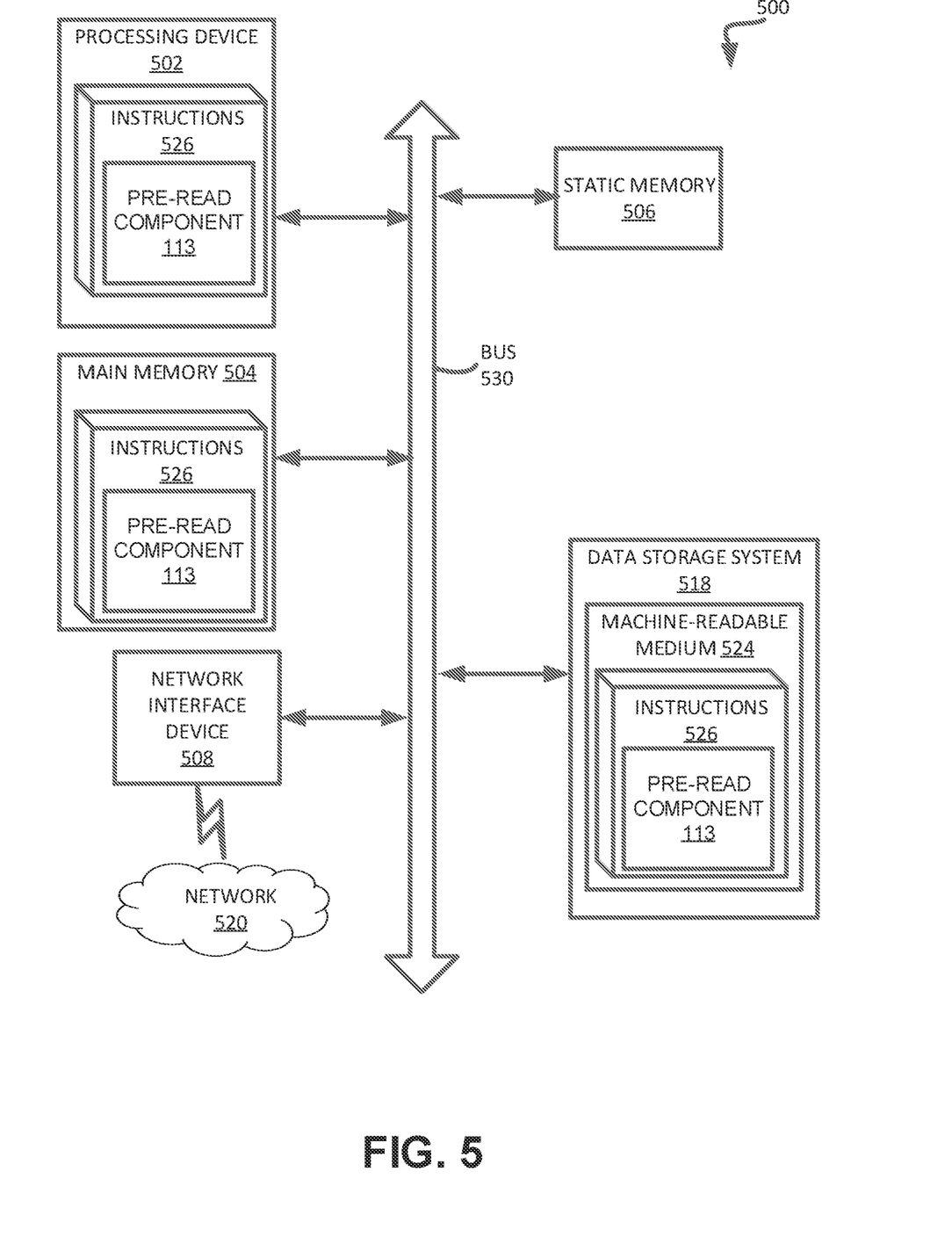
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A or FIG. 3) that includes, is coupled to, or utilizes a memory sub-system (e.g., the memory sub-system 110 of FIG. 1A or FIG. 3) or can be used to perform the operations of a controller (e.g., to execute an operating system to perform operations corresponding to the pre-read component 113 of FIG. 1A or FIG. 3). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud-computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A or FIG. 3.

In one embodiment, the instructions 526 include instructions to implement functionality corresponding to the pre-read component 113 of FIG. 1A or FIG. 3). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein, the singular forms "a," "an," and "the" include plural references unless the context clearly indicates otherwise. Thus, for example, reference to "an active ingredient" includes a single active ingredient as well as a mixture of two or more different active ingredients. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
a memory array; and
control logic, operatively coupled with the memory array, to perform operations comprising:
causing a first program pass of a multi-pass program operation to be performed at the memory array, wherein a first program voltage is applied to a wordline of a plurality of wordlines of a block of the memory array to program one or more memory cells associated with the wordline during the first program pass, wherein the multi-pass program operation programs the one or more memory cells associated with the wordline in multiple stages, and wherein the first program pass of the multi-pass program operation partially programs at least some of the one or more memory cells to a first program level that is different than a final program level;
subsequent to the first program pass of the multi-pass program operation, causing a pre-read operation to be performed to read data corresponding to the first program pass and from the one or more memory cells associated with the wordline of the block of the memory array;
determining, based on the pre-read operation, whether a shift of a threshold voltage (VT) corresponding to the one or more memory cells associated with the wordline satisfies a condition related to a threshold voltage change; and
responsive to determining that the shift of the threshold voltage corresponding to the one or more memory cells associated with the wordline satisfies the condition, determining an updated second program voltage of a second program pass of the multi-pass program operation.

2. The apparatus of claim 1, the control logic to perform the operations further comprising:
causing the second program pass of the multi-pass program operation to be performed at the memory array using the updated second program voltage, wherein the updated second program voltage is applied to the wordline of the plurality of wordlines of the block of the memory array to program the one or more memory cells associated with the wordline during the second program pass.

3. The apparatus of claim 1, the control logic to perform the operations further comprising:
responsive to determining that the shift of the threshold voltage corresponding to the one or more memory cells associated with the wordline does not satisfy the condition, causing the second program pass of the multi-pass program operation to be performed at the memory array using a default second program voltage, wherein the default second program voltage is applied to the wordline of the plurality of wordlines of the block of the memory array to program the one or more memory cells associated with wordline during the second program pass.

4. The apparatus of claim 1, wherein causing the pre-read operation to be performed to read the data corresponding to the first program pass and from the one or more memory cells associated with the wordline of the block of the memory array, comprises:
reading data corresponding to a particular distribution of a plurality of distributions that are associated with the one or more memory cells associated with the wordline, wherein the one or more memory cells comprise multi-bit memory cells.

5. The apparatus of claim 1, wherein determining whether the shift of the threshold voltage (VT) corresponding to the one or more memory cells associated with the wordline satisfies the condition related to the threshold voltage change based on the pre-read operation, comprises:
determining an error count based on the data read from the pre-read operation; and
determining whether the error count exceeds a threshold error count.

6. The apparatus of claim 5, wherein determining the updated second program voltage of the second program pass of the multi-pass program operation, comprises:
responsive to determining that the error count exceeds the threshold error count, identifying a record identifying a plurality of updated second program voltages, each of the plurality of updated second program voltages associated with a particular error count; and
selecting the updated second program voltage from the plurality of updated second program voltages based on the error count.

7. The apparatus of claim 1, wherein determining the updated second program voltage of the second program pass of the multi-pass program operation, comprises:
identifying a record identifying a plurality of updated second program voltages; and
selecting the updated second program voltage from the plurality of updated second program voltages based on the data read from the pre-read operation.

8. The apparatus of claim 1, wherein determining the updated second program voltage of the second program pass of the multi-pass program operation, comprises:
identifying a model associated with a plurality of second program voltages; and
identifying the updated second program voltage from output of the model, wherein input to the model corresponds to the data read from the pre-read operation.

9. The apparatus of claim 1, wherein the memory array and the control logic are encased in a single integrated circuit package.

10. A method comprising:
causing, by a processing device, a first program pass of a multi-pass program operation to be performed at a memory array, wherein a first program voltage is applied to a wordline of a plurality of wordlines of a block of the memory array to program one or more memory cells associated with the wordline during the first program pass, wherein the multi-pass program operation programs the one or more memory cells associated with the wordline in multiple stages, and wherein the first program pass of the multi-pass program operation partially programs at least some of the one or more memory cells to a first program level that is different than a final program level;

subsequent to the first program pass of the multi-pass program operation, causing a pre-read operation to be performed to read data corresponding to the first program pass and from the one or more memory cells associated with the wordline of the block of the memory array;

determining, based on the pre-read operation, whether a shift of a threshold voltage (VT) corresponding to the one or more memory cells associated with the wordline satisfies a condition related to a threshold voltage change; and responsive to determining that the shift of the threshold voltage corresponding to the one or more memory cells associated with the wordline satisfies the condition, determining an updated second program voltage of a second program pass of the multi-pass program operation.

11. The method of claim 10, further comprising:
causing the second program pass of the multi-pass program operation to be performed at the memory array using the updated second program voltage, wherein the updated second program voltage is applied to the wordline of the plurality of wordlines of the block of the memory array to program the one or more memory cells associated with the wordline during the second program pass.

12. The method of claim 10, further comprising:
responsive to determining that the shift of the threshold voltage corresponding to the one or more memory cells associated with the wordline does not satisfy the condition, causing the second program pass of the multi-pass program operation to be performed at the memory array using a default second program voltage, wherein the default second program voltage is applied to the wordline of the plurality of wordlines of the block of the memory array to program the one or more memory cells associated with wordline during the second program pass.

13. The method of claim 10, wherein causing the pre-read operation to be performed to read the data corresponding to the first program pass and from the one or more memory cells associated with the wordline of the block of the memory array, comprises:
reading data corresponding to a particular distribution of a plurality of distributions that are associated with the one or more memory cells associated with the wordline, wherein the one or more memory cells comprise multi-bit memory cells.

14. The method of claim 10, wherein determining whether the shift of the threshold voltage (VT) corresponding to the one or more memory cells associated with the wordline satisfies the condition related to the threshold voltage change based on the pre-read operation, comprises:
determining an error count based on the data read from the pre-read operation; and
determining whether the error count exceeds a threshold error count.

15. The method of claim 14, wherein determining the updated second program voltage of the second program pass of the multi-pass program operation, comprises:
responsive to determining that the error count exceeds the threshold error count, identifying a record identifying a plurality of updated second program voltages, each of the plurality of updated second program voltages associated with a particular error count; and
selecting the updated second program voltage from the plurality of updated second program voltages based on the error count.

16. The method of claim 10, wherein determining the updated second program voltage of the second program pass of the multi-pass program operation, comprises:
identifying a record identifying a plurality of updated second program voltages; and
selecting the updated second program voltage from the plurality of updated second program voltages based on the data read from the pre-read operation.

17. A memory device, comprising:
a memory array; and
control logic, operatively coupled with the memory array, to perform operations comprising:
causing a first program pass of a multi-pass program operation to be performed at a memory array, wherein a first program voltage is applied to a wordline of a plurality of wordlines of a block of the memory array to program one or more memory cells associated with the wordline during the first program pass, wherein the multi-pass program operation programs the one or more memory cells associated with the wordline in multiple stages, and wherein the first program pass of the multi-pass program operation partially programs at least some of the one or more memory cells to a first program level that is different than a final program level;
receiving a command to perform a second program pass of the multi-pass program operation at the memory array;
responsive to receiving the command to perform the second program pass of the multi-pass program operation, causing a pre-read operation to be performed to read data corresponding to the first program pass and from the one or more memory cells associated with the wordline of the block of the memory array; and
determining an updated second program voltage of the second program pass of the multi-pass program operation based on the data read by the pre-read operation.

18. The memory device of claim 17, the control logic further to perform the operations comprising:
determining, based on the pre-read operation, whether a shift of a threshold voltage (VT) corresponding to the one or more memory cells associated with the wordline satisfies a condition related to a threshold voltage change, wherein determining the updated second program voltage of the second program pass is responsive to determining that the shift of the threshold voltage corresponding to the one or more memory cells associated with the wordline satisfies the condition, and
wherein causing the pre-read operation to be performed to read the data corresponding to the first program pass and from the one or more memory cells associated with the wordline of the block of the memory array, comprises:
reading data corresponding to a particular distribution of a plurality of distributions that are associated with the one or more memory cells associated with the wordline, wherein the one or more memory cells comprise multi-bit memory cells.

19. The memory device of claim 18, wherein determining whether the shift of the threshold voltage (VT) corresponding to the one or more memory cells associated with the wordline satisfies the condition related to the threshold voltage change based on the pre-read operation, comprises:

determining an error count based on the data read from the pre-read operation; and determining whether the error count exceeds a threshold error count.

20. The memory device of claim 17, the operations further comprising:

causing the second program pass of the multi-pass program operation to be performed at the memory array using the updated second program voltage, wherein the updated second program voltage is applied to the wordline of the plurality of wordlines of the block of the memory array to program the one or more memory cells associated with the wordline during the second program pass.

* * * * *